United States Patent [19]
Hoffmann et al.

[11] 3,888,951
[45] June 10, 1975

[54] O-ARYL-THIONO ALKANEPHOSPHONIC ACID ESTER-FORMAMIDINES

[75] Inventors: Hellmut Hoffmann, Wuppertal-Elberfeld; Ingeborg Hammann, Cologne; Bernhard Homeyer, Opladen, all of Germany

[73] Assignee: Bayer Aktiengesellschaft, Leverkusen, Germany

[22] Filed: Jan. 9, 1974

[21] Appl. No.: 431,833

[30] Foreign Application Priority Data
Jan. 27, 1973 Germany............................ 2304062

[52] U.S. Cl. ................. 260/945; 260/944; 260/950; 260/959; 260/968; 424/211; 424/217
[51] Int. Cl. .......................... C07f 9/24; A01n 9/36
[58] Field of Search .......................... 260/945, 944

[56] References Cited
UNITED STATES PATENTS
3,801,679  4/1974  Hoffmann et al.................. 260/945

*Primary Examiner*—Anton H. Sutto
*Attorney, Agent, or Firm*—Burgess, Dinklage & Sprung

[57] ABSTRACT

O-aryl-thionoalkanephosphonic acid ester-formamidines or imino-ethers of the formula

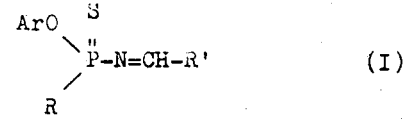

(I)

in which
 R is lower alkyl,
 R' is lower alkoxy, mono-lower alkyl-amino or di-lower-amino, and
 Ar is optionally halogen-substituted phenyl,
which possess insecticidal, acaricidal and nematocidal properties.

6 Claims, No Drawings

O-ARYL-THIONO ALKANEPHOSPHONIC ACID ESTER-FORMAMIDINES

The present invention relates to and has for its objects the provision of particular new O-aryl-thionoalkanephosphonic acid ester-formamidines or iminoethers which possess insecticidal, acaricidal or nematocidal properties, active compositions in the form of mixtures of such compounds with solid and liquid dispersible carrier vehicles, and methods for producing such compounds and for using such compounds in a new way especially for combating pests, e.g. insects, acarids, and nematodes, with other and further objects becoming apparent from a study of the within specification and accompanying examples.

The present invention relates to certain new O-aryl-thionoalkanephosphonic acid ester-imide derivatives, to a process for their preparation and to their use as insecticides, acaricides or nematocides.

It is known from Belgian Patent Specification No. 766,191 that O-aryl-thionalkanephosphonic acid ester-amides, such as O-(3-chloro- (Compound A) or 2,4- (Compound B) or 2,6-dichloro- (Compound C) and 2,4,5-trichlorophenyl)-thionoethanephosphonic acid ester-amide (Compound D), display insecticidal, acaricidal and nematocidal properties.

The present invention provides O-aryl-thionoalkanephosphonic acid ester-formamidines or imino-ethers of the general formula

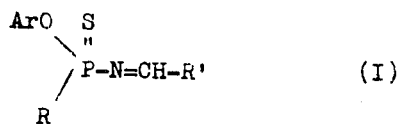

in which
R is lower alkyl,
R' is lower alkoxy, mono-lower alkyl-amino or di-lower-alkyl-amino, and
Ar is optionally halogen-substituted phenyl.

Preferably, R is straight-chain or branched alkyl with 1 to 4, especially 1 to 3, carbon atoms; Ar is phenyl which is monosubstituted or polysubstituted by chlorine, and R' is alkoxy or mono-alkylamino or dialkyl-amino with 1 to 4, especially 1 to 3, carbon atoms per alkoxy or alkyl moiety.

Surprisingly, the O-aryl-thionoalkanephosphonic acid ester-formamidines and imino-ethers of the formula (I), according to the invention, display a substantially better insecticidal, especially soil-insecticidal, acaricidal and nematocidal action than previously known compounds of analogous structure and of the same type of action. The compounds according to the invention thus represent a genuine enrichment of the art.

The invention also provides a process for the production of an O-aryl-thionoalkanephosphonic acid ester-formamidine or imino-ether of the formula (I) in which
a. an O-aryl-thionoalkanephosphonic acid ester-amide of the general formula

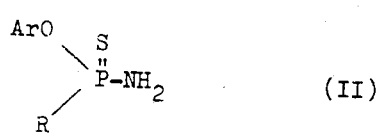

is reacted with a dialkoxy compound of the general formula

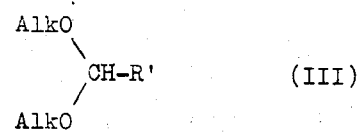

or
b. a phosphorylated imino-formic acid alkyl ester of the general formula

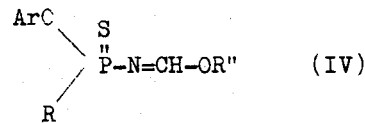

is reacted with a primary or secondary alkylamine of the general formula

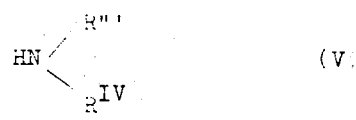

in which formulae (II) to (V)
R, R' and Ar have the abovementioned meanings,
Alk, R'' and R''' are lower alkyl, and
R$^{IV}$ is lower alkyl or hydrogen.

If O-(2-chlorophenyl)-thionoethanephosphonic acid ester-amide and ortho-formic acid triethyl ester or N,N-diethyl-formamide-dimethylacetal or N-[O-(2-chlorophenyl)-thionoethanesphosphonyl-]-iminoformic acid ethyl ester and diethylamine are used as starting compounds, the course of the reactions can be represented by the following formula scheme:

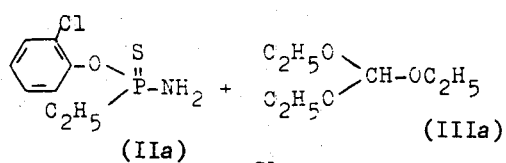

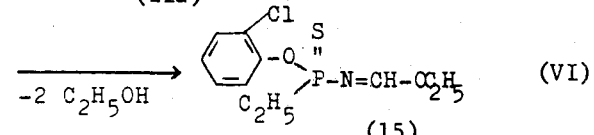

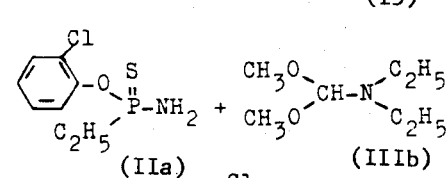

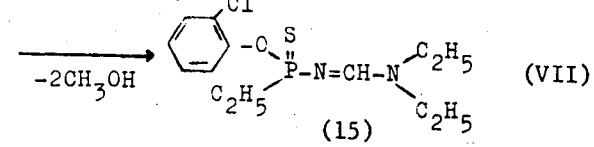

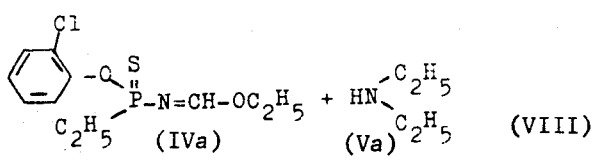

R'', R''' and R$^{IV}$ in the formulae (IV) and (V) preferably denote straight-chain or branched alkyl with 1 to 4, especially 1 to 3, carbon atoms.

The O-aryl-thionoalkanephosphonic acid ester-amides (II) to be used as starting compounds have already been described in the literature and are obtainable according to customary processes, for example according to Belgian Patent Specification No. 766,191; equally, the orthoformic acid alkyl ester derivatives (III) can be prepared according to known methods.

Individually, the following may be mentioned as examples of such compounds O-(2-, 3- and 4-chloro-, 2,4- and 2,6-dichloro-, 2,4,5- and 2,4,6-trichloro- or 2,3,4,5,6-pentachlorophenyl)-methanephosphonic acid ester-amide and the corresponding -ethane-, -n-propane- and -iso-propane-derivatives, and also orthoformic acid trimethyl, ethyl, n-propyl and iso-propyl esters.

Some of the N-alkyl- or N,N-dialkyl-formamide-dialkyl-acetals also to be used as starting compounds are new but they can be prepared according to processes which are in themselves known, e.g. Chemische Berichte, 101 (1968), page 46. The following may be mentioned individually as examples of acetals to be used in the present process: N-(methyl-, ethyl-, n-propyl-, iso-propyl)- or N,N-(dimethyl-, diethyl-, di-n-propyl-, di-iso-propyl)-formamide-dimethyl- or -diethylacetal.

The alkylamines (V) required as starting compounds in process variant (b) are known from the literature and can also be prepared on an industrial scale. The following may be mentioned individually as examples thereof: methylamine, dimethylamine, ethylamine, diethylamine, n-propylamine, di-n-propylamine, iso-propylamine and di-iso-propylamine.

Examples of phosphorylated iminoformic acid alkyl esters (IV) include: N-[2-, 3- and 4-chloro-, 2,4- and 2,6-dichloro-, 2,4,5- and 2,4,6-trichloro- or 2,3,4,5,6-pentachlorophenyl)-thionomethane- or -ethane-, -n-propane- and -iso-propane-phosphoryl]-iminoformic acid methyl esters and the corresponding ethyl esters and propyl esters.

The process of the invention can be carried out in the presence of a diluent. Practically all inert organic solvents can be employed for this purpose. These include in particular aliphatic and aromatic optionally chlorinated hydrocarbons, such as benzene, toluene, xylene, benzine, methylene chloride, chloroform, carbon tetrachloride and chlorobenzene; ethers, for example diethyl ether, dibutyl ether and dioxane; ketones, for example acetone, methyl ethyl ketone, methyl isopropyl ketone and methyl isobutyl ketone; and nitriles, for example acetonitrile and propionitrile.

In process variant (a), when an orthoformic acid alkyl ester is one of the reactants, the reaction can optionally be carried out in the presence of an acid catalyst, for example toluenesulfonic acid.

The reaction temperature can be varied over a wide range. In general, the reaction is carried out at about 60° to 200°C, preferably about 110° to 180°C, in process variant (a), and at about 0° to 150°C, preferably about 40° to 50°C, in variant (b). The reaction is usually allowed to take place under normal pressure.

To carry out process varient (a), the two reactants are preferably brought together in the absence of a solvent or diluent but optionally in the presence of an acid catalyst, the dialkoxy component (III) in most cases being added in about 10 to 25% excess. The reaction mixture is then heated for between one and several hours to the indicated temperatures, at the same time the alcohol formed is distilled off if appropriate, and thereafter the mixture is worked up according to customary methods, for example by "slight distillation" (as defined below).

In variant (b), the reactants are generally employed in equimolar ratio and in most cases without solvents and the mixture is stirred for between one and several hours at the indicated temperatures and then worked up in the usual way.

Some of the new compounds are obtained in the form of oils which mostly cannot be distilled without decomposition but which can be freed of the last volatile constituents by so-called slight distillation, that is to say prolonged heating under reduced pressure to moderately elevated temperatures, and they can in this way be purified. They are characterized by the refractive index. Some of the compounds are obtained in a crystalline form of sharp melting point.

As already mentioned, the O-aryl-thionoalkanephosphonic acid ester-imide derivatives according to the invention are distinguished by an outstanding insecticidal, including soil-insecticidal, acaricidal and nematocidal activity. They couple a low phytotoxicity with a good action against both sucking and biting insects.

For this reason the compounds according to the invention can be employed successfully as pesticides in plant protection and n the hygiene field and field of stored products.

To the sucking insects there belong, in the main, aphids (*Aphidae*) such as the green peach aphid (*Myzus persicae*), the bean aphid (*Doralis fabae*), the bird cherry aphid (*Rhophalosiphum padi*), the pea aphid (*Macrosiphum pisi*) and the potat aphid (*Macrosiphum solanifolii*), the currant gall aphid (Cryptomyzus korschelti), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillers (Lepidoptera) such as the diamond-back moth (*Plutella maculipennis*), the gypsy moth (*Lymantria dispar*), the browntail moth (*Euproctis chrysorrhoea*) and tent caterpiller (*Malacosoma neustria*); further, the cabbage moth (*Mamestra brassicae*) and the cut-worm (*Agrotis segetum*), the large white butterfly (*Pieris brassicae*), the small winter moth (*Cheimatobia brumata*), the green oak tortrix moth (*Tortrix viridana*), the fall army-worm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (Coleoptera), for example the granary weevil (*Sitophilus granarious = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (Bruchidius = *Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Blattella germanica*), American cockroach (*Periplaneta americana*), Madeira cockroach (Leucophaea or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*).

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (Acari) there are classed, in particular, the spider mites (Tetranychidae) such as the two-spotted spider mite (*Tetranychus urticae*) and the European red mite (*Paratetranychus pilosus = Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally ticks, such as the relapsing fever tick (*Ornithodorus moubata*).

When applied against hygiene pests and pests of stored products, particularly flies and mosquitoes, the active compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventonal pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and-/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and nematocides, or fungicides, bactericides, rodenticides, herbicides, fertilizers, growth-regulating agents, etc., if desired, or in the form of particular dosage preparations for specific application made therefrom, such as solutions, emulsions, suspensions, powders, pastes and granules, which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds and also be used in accordance with the well known ultra-low-volume process with good success, i.e. by applying such compound if normally a liquid, or by applying a liquid composition containing the same, via very effective atomizng equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids and nematodes, which comprises applying to at least one of correspondingly (a) such insects, (b) such acarids, (c) such nematodes, and (d) the corresponding habitat thereof, i.e. the locus to be protected, a correspondingly combative or toxic amount, i.e. an insecticidally, acaricidally, or nematocidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

The O-aryl-thionoalkanephosphonic acid esteramides to be used as starting compounds were prepared, for example, as follows:

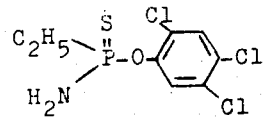

97 g (0.3 mole) of O-(2,4,5-trichlorophenyl)-thionoethanephosphonic acid ester-chloride were added at 10° to 20°C to a mixture of 60 ml of aqueous ammonia and 300 ml of acetonitrile, the reaction solution was stirred for one hour and evaporated, and the residue was taken up in methylene chloride. The organic phase was washed with water and dried, the solvent was distilled off and the residue was recrystallized from ligroin. 65 g (71% of theory) of O-(2,4,5-trichlorophenyl)-thionoethanephosphonic acid esteramide of melting point 74°C were obtained.

The following compounds were obtained analogously:

Table 1

| Structure | Physical properties (melting point °C) | Yield (% of theory) |
|---|---|---|
| $CH_3\underset{H_2N}{\overset{S}{\underset{\|}{P}}}-O-\text{C}_6H_4\text{Cl}$ | 50 | 85 |
| $CH_3\underset{H_2N}{\overset{S}{\underset{\|}{P}}}-O-\text{C}_6H_3\text{Cl}_2$ | 47 | 70 |
| $CH_3\underset{H_2N}{\overset{S}{\underset{\|}{P}}}-O-\text{C}_6H_4\text{Cl}$ | 48–49 | 74 |
| $CH_3\underset{H_2N}{\overset{S}{\underset{\|}{P}}}-O-\text{C}_6H_3\text{Cl}$ | 85 | 75 |

EXAMPLE 2

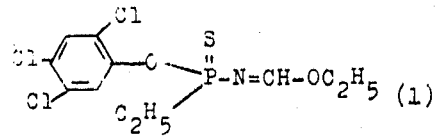

A mixture of 153 g (0.5 mole) of O-(2,4,5-trichlorophenyl)-thionoethanephosphonic acid esteramide and 100 g of orthoformic acid ethyl ester was heated in the presence of approximately 0.5 g of p-toluenesulfonic acid for 1 hour at 140°C, the resulting alkanol was distilled off and the reaction solution was suction-filtered. After slight distillation of the filtrate, 174 g (97% of theory) of N-[O-(2,4,5-trichlorophenyl)-thionoethanephosphoryl]-iminoformic acid ethyl ester of refractive index $n_D^{24}$: 1.5601 were obtained.

EXAMPLE 3

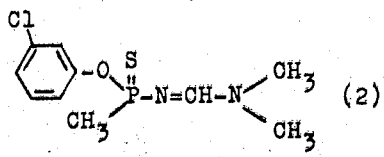

A mixture of 30 g (0.135 mole) of O-(3-chlorophenyl)-thionomethanephosphonic acid ester-amide and 30 g of N,N-dimethylformamide-dimethylacetal was heated for 2 hours under reflux. The resulting ethanol was then distilled off under reduced pressure, giving, as the residue, 36 g (97% of theory) of O-(3-chlorophenyl)-N-(N',N'-dimethylaminomethylidene)-thionomethanephosphonic acid ester-imide of refractive index $n_D^{24}$: 1.5900. The initially oily substance crystallized and then had a melting point of 90°C.

EXAMPLE 4

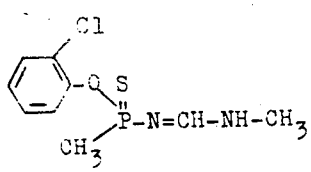

28 g (0.1 mole) of N-[O-2-chlorophenyl)-thionomethanephosphonyl]-iminoformic acid ethyl ester were added dropwise at 0° to 5°C to 15 ml of an approximately 35% strength methylamine solution in 100 ml of acetonitrile, the reaction mixture was stirred for a further hour and then poured into water, the batch was taken up with methylene chloride, the organic phase was washed and after drying the solvent was distilled off. The residue was subjected to slight distillation and 20 g (76% of theory) of O-(2-chlorophenyl)-N-(N'-methylaminomethylidene)-thionomethanephosphonic acid ester-imide of refractive index $n_D^{25}$: 1.6044 were obtained.

EXAMPLE 5

The following compounds were prepared analogously to the method described in the above examples.

Table 2

| Structure | Physical properties | Yield (% of theory) |
|---|---|---|
| (4) | $n_D^{25}$: 1.5580 | 97 |
| (5) | $n_D^{25}$: 1.5555 | 95 |
| (6) | $n_D^{25}$: 1.5660 | 89 |
| (7) | $n_D^{25}$: 1.6010 | 84 |
| (8) | 74–76°C | 80 |

Table 2-Continued

| Structure | Physical properties | Yield (% of theory) |
|---|---|---|
| (9) | 79°C | 46 |
| (10) | 102°C | 79 |
| (11) | 49–51°C | 72 |
| (12) | $n_D^{25}$: 1.5725 | 92 |
| (13) | $n_D^{25}$: 1.5573 | 94 |

Example 6

Plutella test

| | |
|---|---|
| Solvent: | 3 parts by weight of acetone |
| Emulsifier: | 1 part by weight of alkylaryl polyglycol ether |

To produce a suitable preparation of active compound, 1 part by weight of the active compound was mixed with the stated amount of solvent containing the stated amount of emulsifier and the concentrate was diluted with water to the desired concentration.

Cabbage leaves (Brassica oleracea) were sprayed with the preparation of the active compound until dew moist and were then infested with caterpillars of the diamond-back moth (Plutella maculipennis).

After the specified periods of time, the degree of destruction was determined as a percentage: 100% means that all the caterpillars were killed whereas 0% means that none of the caterpillars were killed.

The active compounds, the concentrations of the active compounds, the evaluation times and the results can be seen from the following Table 3:

Table 3

(*Plutella* test)

| Active compound | Active compound concentration in % by weight | Degree of destruction in % after 3 days |
|---|---|---|
| $C_2H_5-\underset{\underset{NH_2}{|}}{\overset{\overset{S}{\|}}{P}}-O-\phantom{}$ (2,4,5-trichlorophenyl) (D) (known) | 0.1<br>0.01<br>0.001 | 100<br>55<br>0 |
| $CH_3-\underset{\underset{N=CH-N(CH_3)_2}{|}}{\overset{\overset{S}{\|}}{P}}-O-$ (4-chlorophenyl) (10) | 0.1<br>0.01<br>0.001 | 100<br>100<br>70 |
| $CH_3-\underset{\underset{N=CH-N(C_2H_5)_2}{|}}{\overset{\overset{S}{\|}}{P}}-O-$ (4-chlorophenyl) (12) | 0.1<br>0.01<br>0.001 | 100<br>95<br>85 |
| $CH_3-\underset{\underset{N=CH-OC_2H_5}{|}}{\overset{\overset{S}{\|}}{P}}-O-$ (2,4-dichlorophenyl) (6) | 0.1<br>0.01<br>0.001 | 100<br>100<br>100 |
| $C_2H_5-\underset{\underset{N=CH-NH-CH_3}{|}}{\overset{\overset{S}{\|}}{P}}-O-$ (2,4,5-trichlorophenyl) (9) | 0.1<br>0.01<br>0.001 | 100<br>100<br>90 |
| $C_2H_5-\underset{\underset{N=CH-N(CH_3)_2}{|}}{\overset{\overset{S}{\|}}{P}}-O-$ (2,4,5-trichlorophenyl) (11) | 0.1<br>0.01<br>0.001 | 100<br>100<br>100 |

EXAMPLE 7

Myzus test (contact action)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 4:

Table 4

(*Myzus* test)

| Active compound | Active compound concentration in % by weight | Degree of destruction in % after 1 day |
|---|---|---|
| $C_2H_5-\underset{\underset{NH_2}{|}}{\overset{\overset{S}{\|}}{P}}-O-$ (4-chlorophenyl) (A) (known) | 0.1<br>0.01<br>0.001 | 100<br>45<br>0 |
| $CH_3-\underset{\underset{N-CH-N(CH_3)_2}{|}}{\overset{\overset{S}{\|}}{P}}-O-$ (4-chlorophenyl) (2) | 0.1<br>0.01<br>0.001<br>0.0001 | 100<br>100<br>95<br>50 |
| $CH_3-\underset{\underset{N=CH-N(CH_3)_2}{|}}{\overset{\overset{S}{\|}}{P}}-O-$ (4-chlorophenyl) (10) | 0.1<br>0.01<br>0.001 | 100<br>99<br>95 |
| $CH_3-\underset{\underset{N=CH-N(C_2H_5)_2}{|}}{\overset{\overset{S}{\|}}{P}}-O-$ (4-chlorophenyl) (12) | 0.1<br>0.01<br>0.001 | 100<br>95<br>85 |
| $C_2H_5-\underset{\underset{N=CH-N(CH_3)_2}{|}}{\overset{\overset{S}{\|}}{P}}-O-$ (2,4,5-trichlorophenyl) (11) | 0.1<br>0.01<br>0.001 | 100<br>100<br>100 |

EXAMPLE 8

Rhopalosiphum test (systemic action)

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Oat plants (*Avena sativa*) which had been strongly infested with the bird cherry ahpid (*Rhopalosiphum padi*) were watered with the preparation of the active compound so that the preparation penetrated into the soil without wetting the leaves of the oat plants. The active compound wsa taken up by the oat plants from the soil and thus reached the infested leaves.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 5:

Table 5
(Rhopalosiphum test)

| Active compound | Active compound concentration in % by weight | Degree of destruction in % after 4 days |
|---|---|---|
| $C_2H_5-\overset{S}{\underset{NH_2}{P}}-O-\text{(4-Cl-phenyl)}$ (A) (known) | 0.1 | 0 |
| $C_2H_5-\overset{S}{\underset{NH_2}{P}}-O-\text{(2,4-Cl}_2\text{-phenyl)}$ (B) (known) | 0.1 | 0 |
| $C_2H_5-\overset{S}{\underset{NH_2}{P}}-O-\text{(2,6-Cl}_2\text{-phenyl)}$ (C) (known) | 0.1 | 0 |
| $C_2H_5-\overset{S}{\underset{NH_2}{P}}-O-\text{(2,4,6-Cl}_3\text{-phenyl)}$ (D) (known) | 0.1 | 0 |
| $CH_3-\overset{S}{\underset{N=CH-NH-CH_3}{P}}-O-\text{(2-Cl-phenyl)}$ (3) | 0.1<br>0.01 | 100<br>100 |
| $CH_3-\overset{S}{\underset{N=CH-NH-CH_3}{P}}-O-\text{(3-Cl-phenyl)}$ (7) | 0.1<br>0.01 | 100<br>100 |
| $CH_3-\overset{S}{\underset{N=CH-NH-CH_3}{P}}-O-\text{(4-Cl-phenyl)}$ (8) | 0.1<br>0.01 | 100<br>100 |
| $CH_3-\overset{S}{\underset{N=CH-N(CH_3)_2}{P}}-O-\text{(4-Cl-phenyl)}$ (2) | 0.1<br>0.01 | 100<br>100 |

Table 5-Continued
(Rhopalosiphum test)

| Active compound | Active compound concentration in % by weight | Degree of destruction in % after 4 days |
|---|---|---|
| $CH_3-\overset{S}{\underset{N=CH-N(CH_3)_2}{P}}-O-\text{(4-Cl-phenyl)}$ (10) | 0.1<br>0.01<br>0.001 | 100<br>100<br>98 |
| $CH_3-\overset{S}{\underset{N=CH-N(C_2H_5)_2}{P}}-O-\text{(2-Cl-phenyl)}$ (12) | 0.1<br>0.01 | 100<br>95 |
| $CH_3-\overset{S}{\underset{N=CH-OC_2H_5}{P}}-O-\text{(2-Cl-phenyl)}$ (4) | 0.1<br>0.01 | 100<br>100 |
| $CH_3-\overset{S}{\underset{N=CH-OC_2H_5}{P}}-O-\text{(3-Cl-phenyl)}$ (5) | 0.1<br>0.01 | 100<br>100 |
| $CH_3-\overset{S}{\underset{N=CH-OC_2H_5}{P}}-O-\text{(2,4-Cl}_2\text{-phenyl)}$ (6) | 0.1<br>0.01 | 100<br>40 |

Example 9

Tetranychus test (resistant)

| | |
|---|---|
| Solvent: | 3 parts by weight of acetone |
| Emulsifier: | 1 part by weight of alkylaryl polyglycol ether |

To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10 – 30 cm, were sprayed with the preparation of the active compound until dripping wet. These bean plants were heavily infested with the common or two-spotted spider mite (*Tetranychus urticae*) in all stages of development.

After the specified periods of time, the effectiveness of the preparation of active compound was determined by counting the dead mites. The degree of destruction thus obtained is expressed as a percentage: 100% means that all the spider mites were killed whereas 0% means that none of the spider mites were killed.

The active compounds, the concentrations of the active compounds, the evaluation times and the results can be seen from the following Table 6:

Table 6

(Tetranychus test)

| Active compound | Active compound concentration in % by weight | Degree of destruction in % after 2 days |
|---|---|---|
| (C) (known) $C_2H_5-\overset{\overset{S}{\|}}{\underset{NH_2}{P}}-O-\text{(2,6-Cl}_2\text{C}_6\text{H}_3)$ | 0.1<br>0.01 | 45<br>0 |
| (D) (known) $C_2H_5-\overset{\overset{S}{\|}}{\underset{NH_2}{P}}-O-\text{(2,4,5-Cl}_3\text{C}_6\text{H}_2)$ | 0.1<br>0.01 | 40<br>0 |
| (3) $CH_3-\overset{\overset{S}{\|}}{\underset{N=CH-NH-CH_3}{P}}-O-\text{(2-Cl-C}_6\text{H}_4)$ | 0.1 | 100 |
| (7) $CH_3-\overset{\overset{S}{\|}}{\underset{N=CH-NH-CH_3}{P}}-O-\text{(4-Cl-C}_6\text{H}_4)$ | 0.1<br>0.01 | 100<br>98 |
| (8) $CH_3-\overset{\overset{S}{\|}}{\underset{N=CH-NH-CH_3}{P}}-O-\text{(3-Cl-C}_6\text{H}_4)$ | 0.1<br>0.01 | 100<br>20 |
| (12) $CH_3-\overset{\overset{S}{\|}}{\underset{N=CH-N(C_2H_5)_2}{P}}-O-\text{(2-Cl-C}_6\text{H}_4)$ | 0.1<br>0.01 | 100<br>100 |
| (4) $CH_3-\overset{\overset{S}{\|}}{\underset{N=CH-OC_2H_5}{P}}-O-\text{(2-Cl-C}_6\text{H}_4)$ | 0.1 | 100 |

Table 6-Continued (Tetranychus test)

| Active compound | Active compound concentration in % by weight | Degree of destruction in % after 2 days |
|---|---|---|
| (6) $CH_3-\overset{\overset{S}{\|}}{\underset{N=CH-OC_2H_5}{P}}-O-\text{(2,4-Cl}_2\text{C}_6\text{H}_3)$ | 0.1 | 100 |
| (11) $C_2H_5-\overset{\overset{S}{\|}}{\underset{N=CH-N(CH_3)_2}{P}}-O-\text{(2,4,5-Cl}_3\text{C}_6\text{H}_2)$ | 0.1 | 100 |

EXAMPLE 10

Critical concentration test

Test nematode: *Meloidogyne incognita*
Solvent: 3 parts by weight of acetone
Emulsifier: 1 part by weight of alkylaryl polyglycol ether To produce a suitable preparation of active compound, 1 part by weight of active compound was mixed with the stated amount of solvent, the stated amount of emulsifier was added and the concentrate was diluted with water to the desired concentration.

The preparation of active compound was intimately mixed with soil which was heavily infested with the test nematodes. The concentration of the active compound in the preparation was of practically no importance; only the amount of active compound per unit volume of soil, which is given in ppm (by weight) was decisive. The soil was filled into pots, lettuce was sown in and the pots were kept at a greenhouse temperature of 27°C. After 4 weeks, the lettuce roots were examined for infestation with nematodes, and the degree of effectiveness of the active compound was determined as a percentage. The degree of effectiveness was 100% when infestation is completely avoided; it was 0% when the infestation was exactly the same as in the case of the control plants in untreated soil which had been infested in the same manner.

The active compound, the amounts applied and the results can be seen from the following Table 7:

Table 7

(*Meloidogyne incognita* test)

| Active compound | Degree of destruction in % at an active compound concentration of | | | |
|---|---|---|---|---|
| | 20 | 10 | 5 | 2.5 ppm |
| (D) (known) $C_2H_5-\overset{\overset{S}{\|}}{\underset{NH_2}{P}}-O-\text{(2,4,5-Cl}_3\text{C}_6\text{H}_2)$ | 0 | | | |

Table 7 — Continued (*Meloidogyne incognita* test)

| Active compound | Degree of destruction in % at an active compound concentration of | | | | |
|---|---|---|---|---|---|
| | 20 | 10 | 5 | 2.5 | ppm |
| (B) (known) | 0 | | | | |
| (C) (known) | 0 | | | | |
| (7) | 100 | 95 | | | |
| (8) | 100 | 95 | 30 | | |
| (10) | 100 | 98 | 90 | 50 | |
| (12) | 100 | 98 | 90 | 50 | |

It will be appreciated that the instant specification and examples are set forth by way of illustration and not limitation, and that various modifications and changes may be made without departing from the spirit and scope of the present invention.

What is claimed is:

1. An O-aryl-thionoalkanephosphonic acid esterimide derivative of the formula

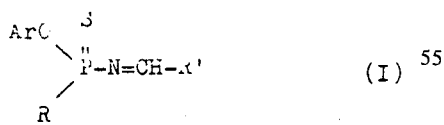

in which
R is lower alkyl,
R' is mono-lower alkyl-amino or di-lower alkylamino, and
Ar is optionally halogen-substituted phenyl.

2. A compound according to claim 1 in which R is alkyl of 1 to 3 carbon atoms, R' is monoalkylamino or dialkylamino with 1 to 3 carbon atoms per alkyl moiety, and Ar is chlorophenyl.

3. The compound according to claim 1 wherein such compound is O-(3-chlorophenyl)-N-(N',N'-dimethylaminomethylidene)-thionoethanephosphonic acid esterimide of the formula

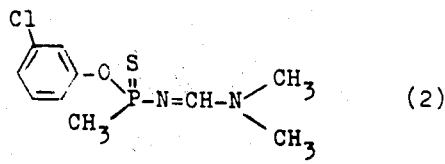

4. The compound according to claim 1 wherein such compound is O-(4-chlorophenyl)-N-(N',N'-dimethylaminomethylidene)-thionomethanephosphonic acid esterimide of the formula

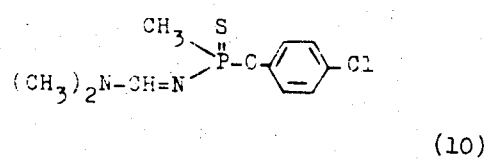

5. The compound according to claim 1 wherein such compound is O-(2,4,5-trichlorophenyl)-N-(N',N'-dimethylaminomethylidene)-thionoethanephosphonic acid ester-imide of the formula
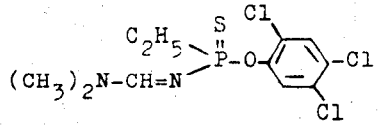
(11)
6. The compound according to claim 1 wherein such compound is O-(3-chlorophenyl)-N-(N',N'-diethylaminomethylidene)-thionomethanephosphonic acid ester-imide of the formula
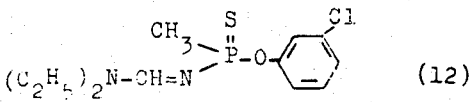
(12)
* * * * *

UNITED STATES PATENT OFFICE
CERTIFICATE OF CORRECTION

PATENT NO. : 3,888,951
DATED : June 10, 1975
INVENTOR(S) : Hellmut Hoffmann, Ingeborg Hammann, Bernhard Homeyer It is certified that error appears in the above-identified patent and that said Letters Patent are hereby corrected as shown below:

Col. 4, line 47, cancel "n" and substitute -- in --

Col. 4, line 53, cancel "potat" and substitute -- potato --

Col. 7, line 21, cancel "and" and substitute -- can --

Col. 9, table 2, after the last structural formula insert

-- (8) --

Col. 10, table 2, before the first structural formula cancel "(8)"

Col. 12, line 12, cancel the heading for table 4 and substitute (Myzus test)
-- Active compound    Active com-           Degree of
                      pound concen-         destruction
                      tration in %          in % after
                      by weight             1 day --

Col. 12, line 66, cancel "wsa" and substitute -- was --.

Signed and Sealed this twenty-eight Day of October 1975

[SEAL]

Attest:

RUTH C. MASON
Attesting Officer

C. MARSHALL DANN
Commissioner of Patents and Trademarks